United States Patent
Peleg et al.

(10) Patent No.: US 10,216,580 B1
(45) Date of Patent: Feb. 26, 2019

(54) SYSTEM AND METHOD FOR MAINFRAME COMPUTERS BACKUP AND RESTORE ON OBJECT STORAGE SYSTEMS

(71) Applicant: MODEL9 SOFTWARE LTD., Kiryat Ono (IL)

(72) Inventors: Gil Peleg, Kiryat-Ono (IL); Yuval Kashtan, Tel-Aviv (IL); Tomer Zelberzvig, Rehovot (IL); Dori Polotsky, Tel-Aviv (IL); Offer Baruch, Gannei Tikva (IL)

(73) Assignee: MODEL9 SOFTWARE LTD., Kiryat Ono (IL)

( * ) Notice: Subject to any disclaimer, the term of this patent is extended or adjusted under 35 U.S.C. 154(b) by 0 days.

(21) Appl. No.: 15/940,306

(22) Filed: Mar. 29, 2018

(51) Int. Cl.
*G06F 17/30* (2006.01)
*G06F 11/14* (2006.01)

(52) U.S. Cl.
CPC ...... *G06F 11/1448* (2013.01); *G06F 11/1464* (2013.01); *G06F 17/30076* (2013.01); *G06F 17/30203* (2013.01); *G06F 17/30569* (2013.01); *G06F 17/30578* (2013.01)

(58) Field of Classification Search
USPC ........................................................ 707/640
See application file for complete search history.

(56) References Cited

U.S. PATENT DOCUMENTS

| | | | |
|---|---|---|---|
| 9,503,542 B1* | 11/2016 | Wang | H04L 67/06 |
| 2008/0209132 A1* | 8/2008 | Chen | G06F 11/1435 |
| | | | 711/141 |
| 2009/0271454 A1* | 10/2009 | Anglin | G06F 11/1453 |
| 2014/0074794 A1* | 3/2014 | Chavda | G06F 11/1453 |
| | | | 707/679 |
| 2014/0201486 A1* | 7/2014 | Zhu | G06F 11/1451 |
| | | | 711/162 |
| 2015/0212900 A1* | 7/2015 | Hayasaka | G06F 11/1453 |
| | | | 707/652 |
| 2015/0213049 A1* | 7/2015 | Kleiman | G06F 17/30159 |
| | | | 707/692 |
| 2015/0293817 A1* | 10/2015 | Subramanian | G06F 17/30212 |
| | | | 707/645 |
| 2016/0292045 A1* | 10/2016 | Pillai | G06F 11/1464 |
| 2016/0371023 A1* | 12/2016 | Gensler, Jr. | G06F 12/00 |
| 2017/0017553 A1* | 1/2017 | Peleg | G06F 11/1464 |
| 2017/0262191 A1* | 9/2017 | Dewakar | G06F 3/0611 |
| 2018/0081561 A1* | 3/2018 | Todd | G06F 3/0608 |

* cited by examiner

*Primary Examiner* — Bai D Vu
(74) *Attorney, Agent, or Firm* — Myers Wolin, LLC

(57) ABSTRACT

Methods, system and computer program product for backup and restore mainframe data onto an object storage, the methods comprising a backup operation and a restore operation, the backup operation comprising: receiving a request for backing up a data set; splitting the data set into chunks, each chunk having a predetermined size; creating a mapping object; repeating for each chunk: allocating a sender thread to the chunk; transmitting using an object storage API, the chunk having the predetermined size as an object, to the object storage by the sender thread; and updating the mapping object with details of the chunk; subject to the data set being fully split and no more chunks to be transmitted, transmitting the mapping object to the object storage by the sender thread; and writing an identifier of the data set and meta data of the mapping object to a database.

18 Claims, 3 Drawing Sheets

SYSTEM AND METHOD FOR MAINFRAME COMPUTERS BACKUP AND RESTORE ON OBJECT STORAGE SYSTEMS

TECHNICAL FIELD

The present disclosure relates to mainframe computers in general, and to a system and method for backing up mainframe computers on object storage systems, in particular.

BACKGROUND

Backing up computers is an important task in the everyday operation of computer systems. Backup may be required for retrieval of information in cases of human errors, technical failures, upgrades, or the like, as well as for legal or operational reasons.

Traditionally, tapes were used for storing large amounts of computer data. Tapes are reliable and are considered environmentally friendly, i.e., do not waste energy, unlike disks that spin constantly and consume energy. However, tapes have some significant drawbacks. For example, they take up a lot of physical space, and retrieving data from tapes may take a long time, for example in the order of magnitude of minutes, as compared to milliseconds in disks.

In addition, handling tapes necessitates manual labor. For example, operations such as making copies of tapes have to be done manually, creating backups at off-site locations cannot be performed without physically transporting them, or the like.

Further, when keeping data on tapes for long periods of time, such as years or decades, supporting tape drives have to be maintained in order to retrieve data from the tape when required. This drawback also implies that upgrading the used tape drive technology may be a complex operation.

Object storage, also referred to as object-based storage, is a computer data storage architecture that manages data in the form of objects, as opposed to other storage architectures such as Count key data (CKD) storage currently used by mainframe systems, or file systems. Each object typically includes metadata, the data itself, and a globally unique identifier. Object storage provides capabilities not addressed by other storage architectures, such as interfaces that can be programmable by an application developer as part of the application development, a namespace that can span multiple instances of physical hardware, data-management functions such as data replication and data distribution at object-level granularity, or others. Object-storage systems allow retention of massive amounts of unstructured data, and is thus used, inter alia, for purposes such as storing photos, songs, or files in online collaboration services. Object storage is gaining popularity in the backup arena on open systems. Object storage, as the name suggests, stores objects, and before creating a new object, for example when backing up data, needs to a-priori know the size of the object.

Due to inherent limitations, mainframe (MF) computers still use tapes for backup, and are thus deprived from enjoying the advantages of modern storage systems.

BRIEF SUMMARY

One exemplary embodiment of the disclosed subject matter is a computer-implemented method comprising: a computer-implemented method comprising: receiving a request for backing up a data set from a mainframe onto an object storage; splitting the data set into a multiplicity of chunks, each chunk of the multiplicity of chunks having a predetermined size; creating a mapping object; repeating for each chunk: allocating a sender thread to the chunk; transmitting using an object storage Application programming interface (API), the chunk having the predetermined size as an object, to the object storage by the sender thread; and updating the mapping object with details of the chunk; subject to the data set being fully split and no more chunks to be transmitted, transmitting the mapping object to the object storage by the sender thread; and writing an identifier of the data set and meta data of the mapping object to a database. Within the method, splitting the data set into a multiplicity of chunks optionally comprises repeating: extracting a block from the data set; and adding the block into a chunk until the chunk reaches the predetermined size, until all blocks have been extracted from the data set. Within the method, extracting the block from the data set is optionally performed by data facility data set services (DFDSS) being called with a callback function parameter, such that the DFDSS calls the callback function during extracting the block from the data set to thereby accumulate chunks from a sequence of blocks. Within the method, allocating the sender thread to the chunk optionally comprises: queuing the chunk to a chunk queue; and having an available sender thread dequeue a chunk from the chunk queue. The method can further comprise compressing the chunk or encrypting the chunk prior to transmitting the chunk to the object storage. Within the method, the chunk is optionally transmitted over TCP/IP.

Another exemplary embodiment of the disclosed subject matter is a computer-implemented method comprising: receiving a request to restore a data set from an object storage, to a mainframe; querying a database to retrieve an object name of a mapping object associated with the data set; reading the mapping object from the object storage; invoking data facility data set services (DFDSS); for each chunk from the chunks described in the mapping objects, requesting and receiving a chunk from the object storage using object storage API, each chunk having a sequence number; and restoring the data set from the chunks in accordance with the sequence number. Within the method, invoking the DFDSS optionally comprises providing a callback function. Within the method, restoring the data set from multiplicity of chunks optionally comprises repeating: extracting one or more blocks from the chunk; passing the one or more blocks to the DFDSS by the callback function; and restoring the data set from the blocks. The method can comprise decrypting or decompressing each chunk received from the object storage. Within the method, the chunk is optionally received over TCP/IP.

Yet another exemplary embodiment of the disclosed subject matter is a system for backup and restore mainframe data on a backup server, comprising: a processor, the processor being adapted to perform a first set of steps comprising: receiving a request for backing up a data set from a mainframe onto an object storage; splitting the data set into a multiplicity of chunks, each chunk of the multiplicity of chunks having a predetermined size; creating a mapping object; repeating for each chunk: allocating a sender thread to the chunk; transmitting using an object storage Application programming interface (API), the chunk having the predetermined size as an object, to the object storage by the sender thread; and updating the mapping object with details of the chunk; subject to the data set being fully split and no more chunks to be transmitted, transmitting the mapping object to the object storage by the sender thread; and write an identifier of the data set and meta data of the mapping object to a database; and a second set of steps comprising: receiving a request to restore a data set from an object storage, to a mainframe; querying a database to retrieve an object name of a mapping object associated with the data set; reading the mapping object from the object storage; invoking data facility data set services (DFDSS); for each chunk from the chunks described in the mapping objects, requesting and receiving a chunk from the object storage using object storage API, each chunk having a sequence number; and restoring the data set from the chunks in accordance with the sequence number. Within the system, splitting the data set into a multiplicity of chunks optionally comprises repeating: extracting a block from the data set; and adding the block into a chunk until the chunk reaches the predetermined size, until all blocks have been extracted from the data set; and restoring the data set from multiplicity of chunks optionally comprises repeating: extracting one or more blocks from the chunk; passing the one or more blocks to the DFDSS by the callback function; and restoring the data set from the blocks. Within the system, extracting the block from the data set or restoring the data set from the blocks is optionally performed by data facility data set services (DFDSS) being called with one or more callback function parameters, such that the DFDSS calls the callback functions during extracting the block from the data set or during restoring the data set from the blocks. Within the system, the processor is optionally further adapted to compress or encrypt the chunk prior to transmitting the chunk to the object storage, or to decompress or decrypt each chunk received from the object storage. Within the system the chunk is optionally transmitted or received over TCP/IP.

Yet another exemplary embodiment of the disclosed subject matter is a computer program product comprising a computer readable storage medium retaining program instructions, which program instructions when read by a processor, cause the processor to perform a method comprising a backup operation and a restore operation, the backup operation comprising: receiving a request for backing up a data set from a mainframe onto an object storage; splitting the data set into a multiplicity of chunks, each chunk of the multiplicity of chunks having a predetermined size; creating a mapping object; repeating for each chunk: allocating a sender thread to the chunk; transmitting using an object storage Application programming interface (API), the chunk having the predetermined size as an object, to the object storage by the sender thread; and updating the mapping object with details of the chunk; subject to the data set being fully split and no more chunks to be transmitted, transmitting the mapping object to the object storage by the sender thread; and writing an identifier of the data set and meta data of the mapping object to a database

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
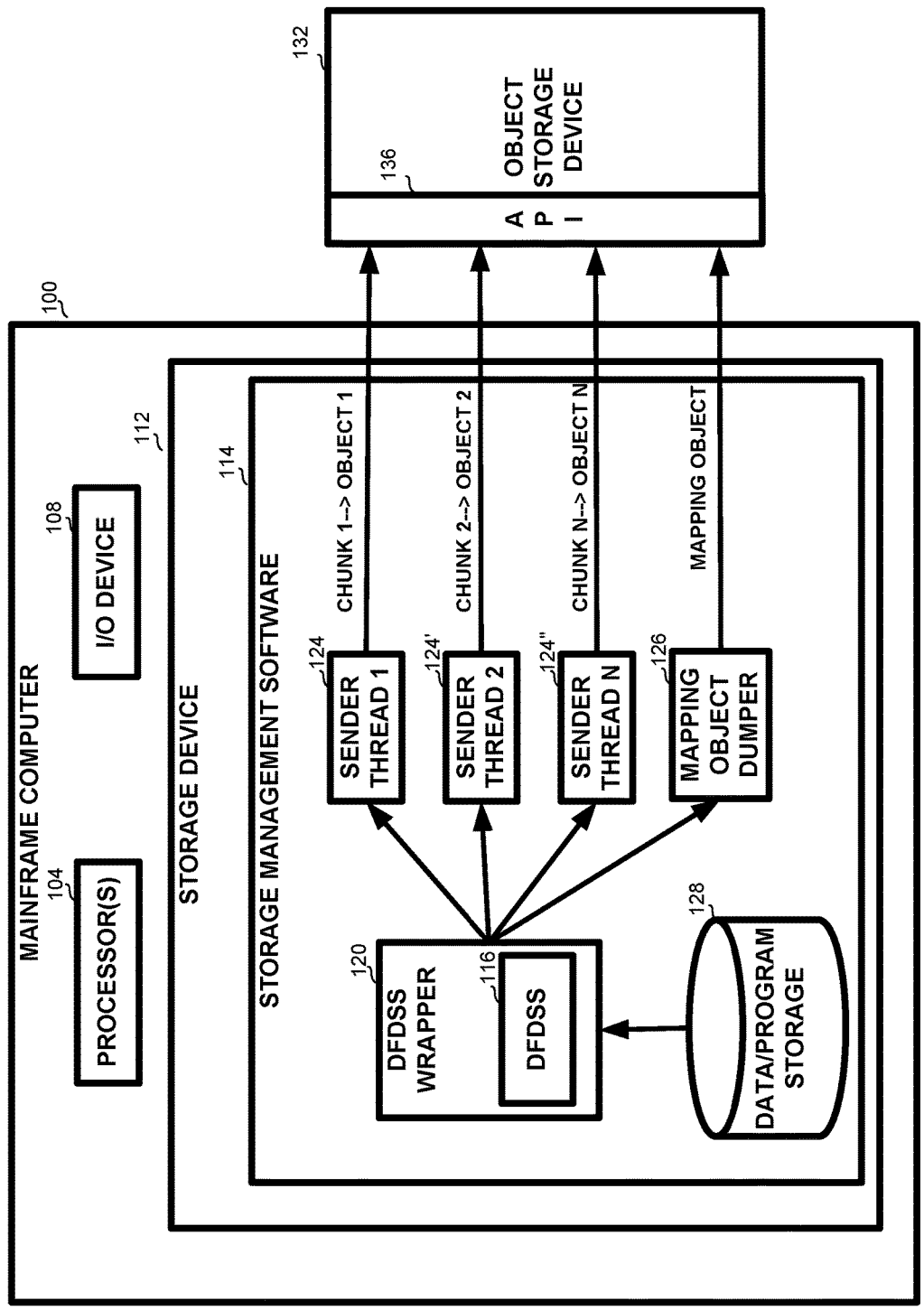
FIG. 1 is a block diagram of components in a mainframe computer in which data sets are backup up and restored to/from object storage, in accordance with some exemplary embodiments of the subject matter.

The disclosure relates to a growing need to backup data from a mainframe (MF) computer to object storage systems. Currently there are no known solutions for such backup, which therefore requires the usage of tapes, with all their drawbacks.

In MF terminology a. "data set" is a file, but unlike other operating system file systems, most data sets are not just a stream of bytes, but are of a complex structure. There are multiple (over 10) different types of data sets, each associated with its own physical structure and format. The file system itself is not hierarchical, but due to architectural limitations on the maximum capacity of a disk can rather span over a large number, possibly thousands, of relatively small capacity disks (typically less than 100 GB usually). Over the years, backup tools have been developed with specific support for the MF file system. The standard backup media in the MF world is a tape, due to its lower cost compared to disks. Moreover, it is impractical to keep large amounts of data on disks due to their capacity limitations and the complexity involved in managing a very large number of disks.

Therefore. MF data sets backup process is substantially different from other platforms, due to the complexity of the MF file structure, which requires pre-processing prior to backing up on tape. Most data set types cannot be read sequentially as a byte stream, but rather require backup software to relate to the physical data set structure and its logical metadata in order to backup a data set. In order to overcome this issue, MF backup management software products use a tool referred to as a "data mover", such as data facility data set services (DFDSS) supplied as part of the operating system. The data mover is a software component responsible for reading the different data set types and writing (i.e., moving) them to tape. The data mover executes the logic to read the various data set types, and generates a stream of bytes to be written to a tape.

A tape is a serial device, meaning that blocks are written to and read from it one after the other. Therefore tapes do not support random read or write operations. A tape block size is limited to 256 Kb. At a given time, there can be only a single MF program or application writing to a tape, on a single tape drive, such that tapes do not support parallel writes or reads to the same tape from multiple applications or even form a single application. Since files are written sequentially until finished, the concept of a file size is irrelevant to a tape. Even if a file size exceeds the tape capacity, the file is continued on a next tape and is cataloged as a multi volume tape file.

One technical problem dealt with by the disclosed subject matter is that object storage APIs require that the size of a written object is known prior to writing the object. This implies that MF backup software needs to know the size of a data set size in advance. However, since DFDSS was designed to write to tape, it does not report the size of the stream it is writing. Even further, due to compression and encryption, the file size may not even be known in advance.

Another technical problem dealt with by the disclosed subject matter is that in object storage the maximum size of an object is limited, wherein each object storage system may have its own limits. However, it is required that an MF backup system will not be vulnerable to this limitation.

In object storage API, it is a common practice to use a technique called multi-part upload. Multi-part upload is used to write (upload) multiple parts of a single large object in parallel to the object storage. The maximum number of parts in a multi-part upload is limited, and each object storage system operates with its own limits. However, it is required that an MF backup system is not vulnerable to this limitation either.

Thus, yet another technical problem dealt with by the disclosed subject matter is the requirement for using any chunk size when storing chunks of information, or even change the chunk size dynamically to adjust for varying LAN/WAN network latency and bandwidth, CPU utilization and memory constraints.

Yet another technical problem dealt with by the disclosed subject matter is that current systems do not allow downloading multiple parts in parallel instead of a single large object. Thus it is required that parallel downloading is enabled.

One technical solution comprises a system for enabling backing up a mainframe data set onto an object storage device. The solution comprises invoking a data mover to generate a stream of blocks from an MF data set of any type, which it is required to backup. The blocks are accumulated into chunks, until a predetermined chunk size is reached. Once a chunk is full, it is queued within a chunk queue for further processing by one of a pool of sender threads, and if needed, another chunk starts to accumulate. Each time a sender thread from the pool is available, it may dequeue a chunk from the queue for processing. Processing may include encrypting and/or compressing the chunk, and then writing the chunk as an object to the object-based storage system. Writing may use an object storage API of the used object storage. Each object is associated with a unique name. The sender thread may update a memory mapping object to indicate the chunk has been successfully written to object storage. Updating may include the chunk object name in the object storage, and a chunk's sequence number in the data mover stream. Each processed chunk is thus indicated in the mapping object after having been written to the object storage. The mapping object may also indicate whether the data set is encrypted and/or compressed, and possibly which encryption/compression algorithms or schemes have been used. Additionally or alternatively, the encryption and compression information may be incorporated into each chunk, for example as part of the chunk name. Once all chunks are written, the mapping object is written to the object storage as well, and an entry is added to a database within the MF storage, which correlates the data set that has been and the mapping object, for future retrieval.

Another technical solution comprises restoring a mainframe data set from an object storage device. The solution comprises receiving from the user, for example via a user interface, an identifier of a data set to be restored, and querying a database within the MF storage to retrieve the name of the applicable mapping object. The object storage API is then used to read the mapping object from the object storage. The chunks described in the mapping object may then be requested and received through the object storage API. Each chunk may be decompressed and/or decrypted if required. The chunk may then be processed to retrieve the blocks, from which the data set can be reconstructed.

One technical effect of the disclosed subject matter is the provisioning of methods and system for backing up and restoring mainframes data sets to and from object storage systems. The methods and system store a backup copy of a data set using multiple objects, instead of multi-part object, in order to overcome the limitation of the unknown data set size, and the limitation of object storage systems on the number of parts in a multi-part object and the object size. Moreover, the object size can be selected to fit all used object storage systems, and can even be selected dynamically.

Another technical effect of the disclosed subject matter is that the methods and system enhance CPU and network utilization, by concurrently processing, transmitting or receiving multiple objects, thus providing for fast backup and retrieval. It will be appreciated that since the object size is known, the methods and system can utilize multi-object backup rather than multi-part backup, in which the number of the parts is limited.

Referring now to FIG. 1, showing a generalized block diagram of a mainframe computer configured to backup and restore data sets to and from object storage.

A mainframe computer is a computer used primarily by large organizations for critical applications, bulk data processing, industry and consumer statistics, enterprise resource planning, transaction processing, or other tasks.

Mainframe 100 may comprise a processor 104. Processor 104 may be a Central Processing Unit (CPU), a microprocessor, an electronic circuit, an Integrated Circuit (IC), a Central Processor (CP), a System Z Information Integration Processor (zIIP), a System Z Application Assist Processor (zAAP), or the like. Processor 104 may be utilized to perform computations required by the apparatus or any of its subcomponents.

In some exemplary embodiments of the disclosed subject matter, mainframe 100 may comprise an Input/Output (I/O) device 108 such as a terminal, a printer, a tape, a disk, a network communications device, or the like. I/O device 108 may be utilized to provide output to and receive input from a user.

In some exemplary embodiments of the disclosed subject matter, mainframe 100 may comprise or be operatively connected to one or more storage devices 112. Storage device 112 may be a hard disk drive, a Flash disk, a Random Access Memory (RAM), a memory chip, real storage, main storage or the like. In some exemplary embodiments, storage device 112 may retain program code operative to cause processor 104 to perform acts associated with any of the programs executed by mainframe 100. The components detailed below may be implemented as one or more sets of interrelated computer instructions, executed for example by processor 104 or by another processor. The components may be arranged as one or more executable files, dynamic libraries, static libraries, methods, functions, services, or the like, programmed in any programming language and under any computing environment.

Storage device 112 may store storage management software 114. Storage management software 114 may comprise data mover such as DFDSS 116, which may be comprised in or otherwise accessed by DFDSS wrapper 120. DFDSS wrapper 120 may be implemented in Java or in another programming language, and may provide for calling functions of DFDSS 116, for example from Java code, as described for example in US2017/0017553 incorporated herein by reference in its entirety and for all purposes. DFDSS 116 can communicate with data/program storage 128, which may store one or more data sets to be backed up or restored.

Storage device 112 may comprise one or more sender threads, such as sender thread 1 (124), sender thread 2 (124'), and so on until sender thread N (124"). The number N of the sender threads may depend on the computing and networking capacity of mainframe 100, and may also vary over time or for different backup/restore tasks. In some embodiments, N may also vary dynamically during a single backup or restore operation.

Object storage 132 can be implemented as any storage system employing the object storage architecture, and may or may not be distributed, and may or may not employ cloud storage, wherein the cloud may or may not be on-premise, and may be private or public.

Each sender thread may communicate with object storage 132 via object storage application program interface (API) 136, such as AWS S3-compliant API, when writing or reading an object representing a chunk to/from object storage 132.

Storage device 112 may comprise mapping object dumper 126 for writing or reading a mapping object to/from object storage 132. Object dumper 126 may also communicate with object storage 132 via object storage API 136, when writing or reading a mapping object to/from object storage 132.

Figure 2:
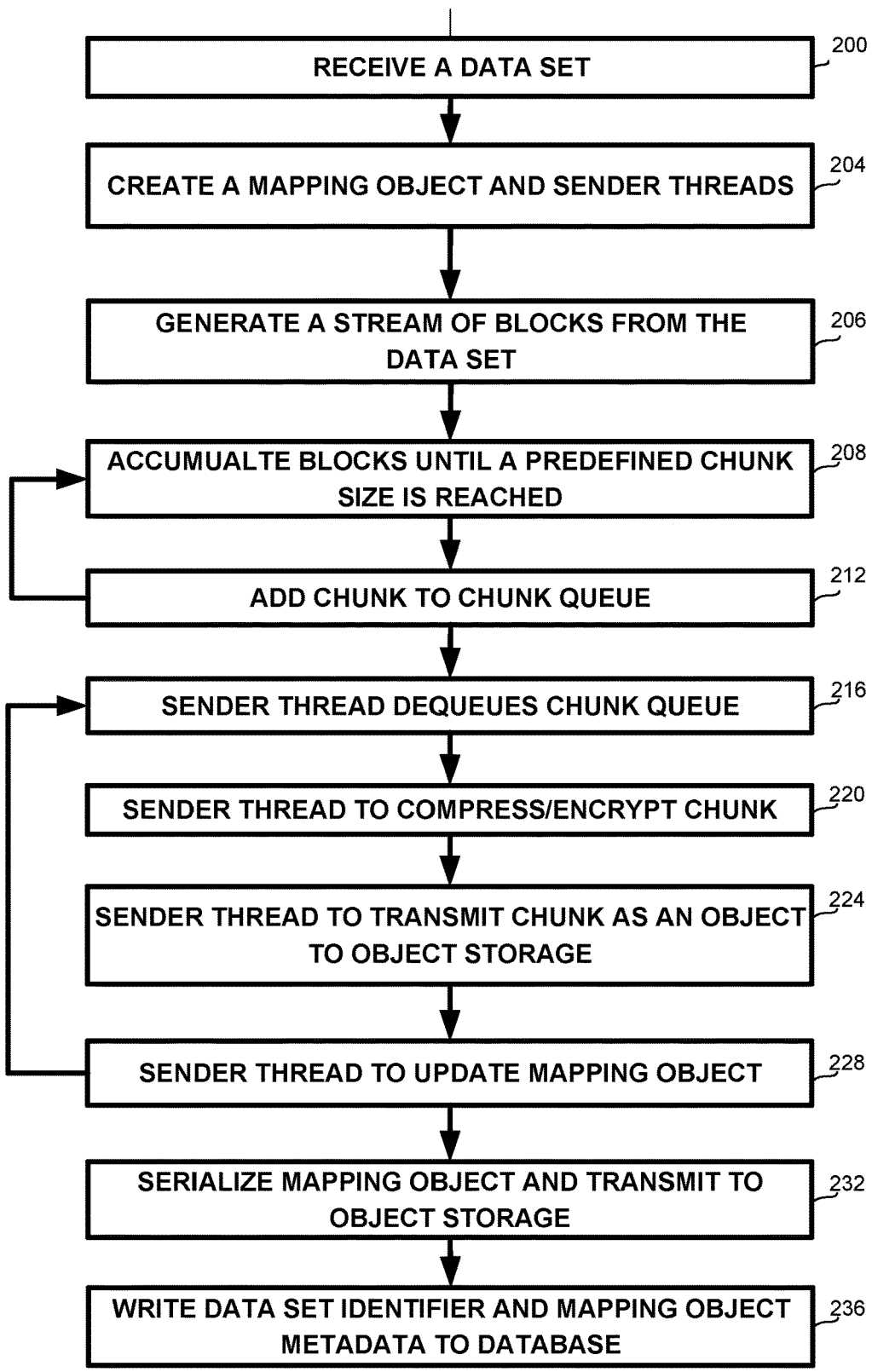
FIG. 2 is a flowchart of steps in a method for backing up mainframe data sets on object storage device, in accordance with some embodiments of the disclosure.

Referring now to FIG. 2, showing a flowchart of steps in a method for backing up mainframe data sets on an object storage device, in accordance with some embodiments of the disclosure. Unless indicated otherwise, the steps below may be performed by DFDSS wrapper 120.

On step 200 a data set available to mainframe 100 may be received for backup. The data set can represent one or more files or volumes.

On step 204, a mapping object may be created. The mapping object may be named or may comprise a name indicating the data set and additional parameters, such as a prefix, a sysplex name, a system name, a data set name, a date and time stamp, a UUID and a suffix. For example, a name may look as follows: file:dataset:ADCDPL:S0W1::M9.DORI.JOBS: 2017-11-02_145522.213Z:3507e407-2e8c-460f-aa75-e821dee79c6c.mapping.json. The mapping object may also comprise information about encryption or compression applied to the data set.

On step 204, or on a separate step performed at one or more other points in time, one or more sender threads may be created, configured to transmit objects to object storage. The number of sender threads may depend on the computing capabilities of the mainframe, and on the bandwidth available for communicating with the object storage. A larger number of sender threads may require more processing resources but may provide for better utilization of the bandwidth.

Steps 206 and 208 below describe splitting the data set into a multiplicity of chunks, each chunk having a predetermined size;

On step 206, a stream of blocks may be generated from the data set. Generating the blocks may comprise invoking data mover such as DFDSS 116 from DFDSS wrapper 120. The invocation of DFDSS 116 may comprise a callback function to be called by DFDSS 116, as described for example in US2017/0017553 incorporated herein by reference in its entirety and for all purposes. Backup agent 112 and communication component 132 described in US2017/0017553 may be comprised in current DFDSS wrapper 120

On step 208, the streamed blocks are accumulated in chunks, each of a predetermined size. The blocks are accumulated into one chunk until the chunk reaches its full size, after which the next chunk starts to accumulate. It will be appreciated that a block may be split between two or more chunks. The chunk size can be selected to be smaller than the maximal object size of the object storage to which the backup is done.

It will be appreciated that splitting the data set into a multiplicity of chunks of a predetermined size may also be performed in other manners than described above.

On step 212, a full chunk, or the last chunk even if not full is added to a chunk queue.

It will be appreciated that steps 208 and 212 may repeat until the data set is fully split to chunks. Steps 216, 220, 224, and 228 described below may be executed in parallel to steps 208 and 212, and are not required to start only when all the data set has been read into blocks.

On step 216, an available sender thread, e.g., a sender thread that is currently not handling another chunk, may dequeue a chunk from the chunk queue.

On step 220, the sender thread may encrypt and/or compress the chunk, using any encryption or compression algorithm in accordance with availability and user's choice.

On step 224, the sender thread may transmit the chuck, whose size is known, as an object to the object storage. Transmission may be done over TCP/IP and by using the object storage APIs. This is unlike existing systems, in which FICON or other MF proprietary transmission protocols must be used.

A chunk name may comprise a prefix, a Sysplex name, a system name, a data set name, a date and time stamp, a UUID and a suffix. For example, a chunk name may look as follows: data-blob:dataset:ADCDPL:SOW 1::M9. DORI-.JOBS:2017-11-02_151252.807Z: 15b78b10-d48a-48c6-8564-2418219faa47:00000001.chunk.bin In some embodiments, a further suffix may be provided indicating a compression algorithm if the chunk is compressed.

The sender thread may write the compressed and encrypted chunk over TCP/IP, using an object storage API, such as but not limited to S3-compliant API or Microsoft Azure BLOB API. For example, in S3API, the Put Object function may be used to write the object.

It will be appreciated that due to the queue structure, it is guaranteed that the chunks are dequeued in the order at which they appear in the dataset. However, it is not guaranteed that the chunks are transmitted and written on the object storage on that order. Thus, the sequence number of the object is critical.

On step 228, once the object is written to the object storage, the sender thread may update the mapping object with the details of the transmitted chunk, including for example the chunk object name in the object storage as detailed above, and the chunk's sequence number in the DFDSS stream.

It will be appreciated that multiple sender threads may be operative concurrently, such that multiple objects are transmitted concurrently to the object storage, thereby providing for better utilization of the communication bandwidth between the mainframe and the object storage.

It will also be appreciated that multiple data sets may be backed up in parallel to the same or to different object storage target devices, using the multiplicity of sender threads.

On step 232, once all chunks have been transmitted and the mapping object has been updated with information of all chunks of the data set, the mapping object, whose size is known, may be serialized, for example to JSON format, and written to the object storage using the object storage API.

On step 236, the data set identifier and the mapping object metadata, for example its name, are written to a local storage, for example on a database stored in a storage device of the mainframe, such that the details of the mapping object can be retrieved when it is required to restore the data set from the object storage.

Figure 3:
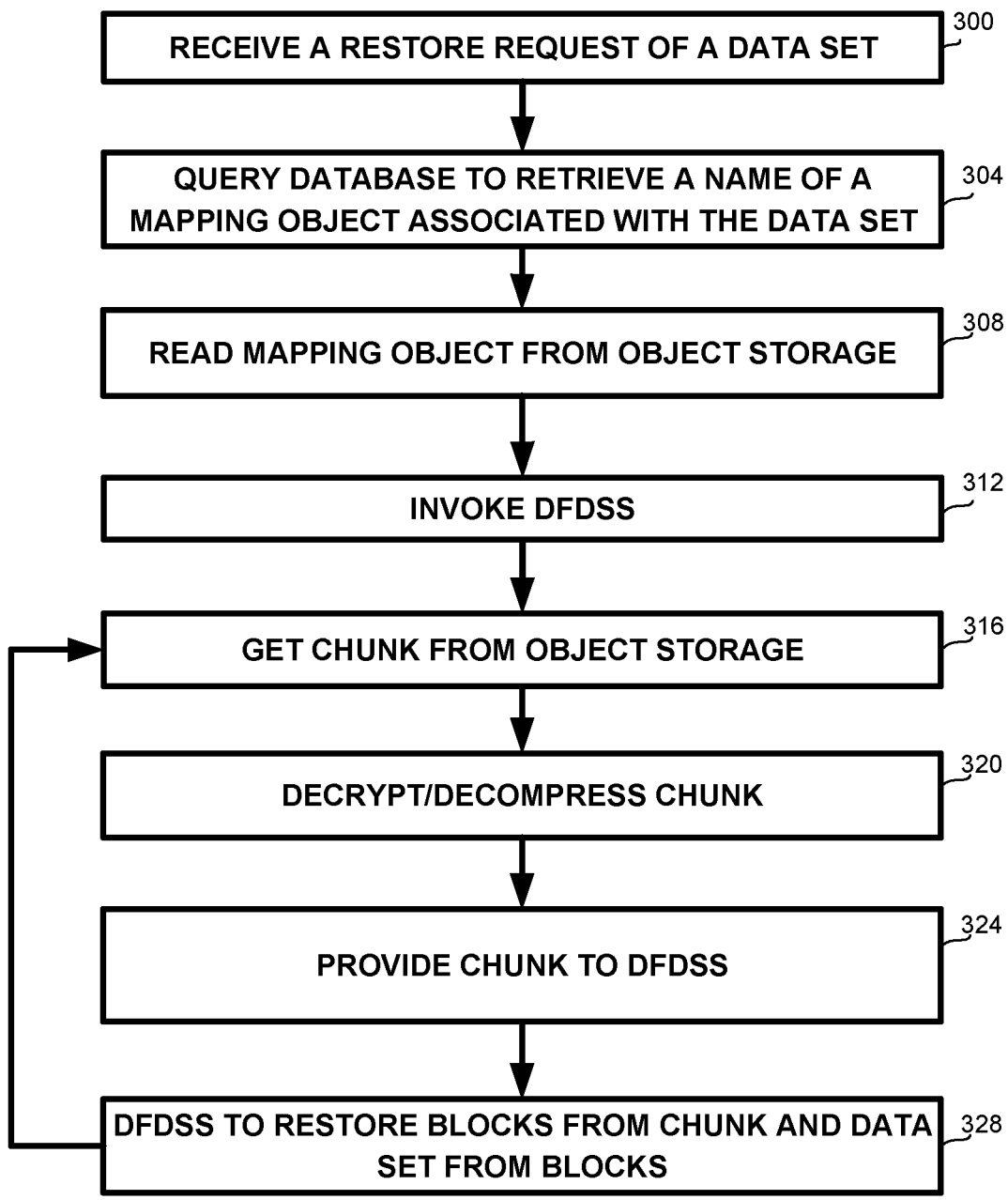
FIG. 3 is a flowchart of steps in a method for restoring mainframe data sets from object storage device, in accordance with some embodiments of the disclosure.

Referring now to FIG. 3, showing a flowchart of steps in a method for restoring mainframe data sets from object storage device, in accordance with some embodiments of the disclosure. Unless indicated otherwise, steps may be performed by DFDSS wrapper 120.

On step 300, a request for restoring a data set may be received, the request indicating the name or another identifier of the data set.

On step 304, a local database of the mainframe, or another database operatively connected to the mainframe is queried for the data set identifier, and a name of a mapping object corresponding to the data set is retrieved.

On step 308, the object storage API is used to read and provide to the mainframe the mapping object as stored in the object storage. Reading may be performed, for example using the Get Object Content function of the S3API. Once the mapping object is available, the chunks from which the data set is to be restored may be requested.

On step 312, a data mover such as DFDSS 116 may be invoked.

On step 316, objects may be requested and received from the object storage using the object storage API, in accordance with the mapping object, such that each object contains a chunk. Receiving the objects may also be done over TCP/IP rather than proprietary protocols.

On step 320, the chunk may be decompressed and/or decrypted if required, in accordance with the metadata described in the mapping object.

On step 324 the chunk may be provided to the DFDSS for further processing.

On step 328, the DFDSS may restore the stream of blocks, as also described in for example in US2017/0017553 incorporated herein by reference in its entirety and for all purposes. The data set may then be restored from the sequence of blocks, in according with the sequence number of each block.

Steps 316, 320, 324 and 328 may be repeated until the DFDSS indicates successful restoration of the data set, or until no more objects are received from the object storage.

It will be appreciated that a multiplicity of objects may be received simultaneously, thus providing for parallel downloading and higher utilization of the available bandwidth.

Listing 1 below shows an example of a mapping object, mapping a data set named IXGLOGR.ATRPOCPLEX.RM.METADATA.A0000000 from POC1 of POCPLEX. This data set is backed up in two chunks.

The name of the mapping object in this case is mapping-file:dataset:ADCDPL:S0W1::IXGLOGR.ATR.POCPLEX.RM.METADATA.A000000 0:2017-11-06_165441.908Z:2465737b-512c-49ba-8bb6-874b5fDc0803.mapping.json. The mapping object may be implemented as follows:

```
{
  mBackupMissionDescriptor:
  {
    backupType: "dataset",
    mResourceType: "DATASET",
    mSysplexIdentifier: "POCPLEX",
    mSystemIdentifier: "POC1",
    mVolumeName: " ",
    mDatasetName:
       "IXGLOGR.ATR.POCPLEX.RM.META-
       DATA.A0000000",
    mAssociatedInstant:
    {
      seconds: 1509987281,
      nanos: 908000000
    },
    mUuid:           "2465737b-512c-49ba-8bb6-
       874b5mDc0803",
    mCompressionType: "DFDSS"
  },
  mTotalSizeInBytes:19397008
  mTotalCompressedSizeInBytes: 19397088,
  mTotalNumberOfDataChunks: 2,
  mStoredDataChunkDescriptors:
  [
    {
      mnDataChunkSeqNumber: 1,
      mStartOffset: 0,
      mOriginalDataSize: 10500519,
      mCompressedSize: 10500519,
      mObjectName:    "agents/default/resources/chunk-
         blobs/data-blob:dataset:POCPLEX:POC1::IX-
         GLOGR.ATR.POCPLEX.RM.META-
         DATA.A00000:2017-11-06_165441.908Z:
         2465737b-512c-49ba-8bb6-874b5fc0803:
         00000001.chunk.bin",
      mObjectSliceStartOffset: 0,
      mObjectSliceLength: 10500519
    },
    {
      mnDataChunkSeqNumber: 2,
      mStartOffset: 10500519,
      mOriginalDataSize: 8896569,
      mCompressedSize: 8896569,
      mObjectName:    "agents/default/resources/chunk-
         blobs/data-blob:dataset:POCPLEX:POC1::IX-
         GLOGR.ATR.POCPLEX.RM.META-
         DATA.A00000:2017-11-06_165441.908Z:
         2465737b-512c-49ba-8bb6-874b5fc0803:
         00000002.chunk.bin",
      mObjectSliceStartOffset: 0,
      mObjectSliceLength: 8896569
    }
  ]
}
```

Listing 1

It will be appreciated that the steps of FIG. 2 and FIG. 3 are not necessarily performed in the disclosed order. For example, the DFDSS may be invoked, or sender threads may be created only when required, blocks may be created in parallel to chunk creation and transmitting or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving a request for backing up a data set from a mainframe onto an object storage;
splitting the data set into a multiplicity of chunks, each chunk of the multiplicity of chunks having a predetermined size;
creating a mapping object;
repeating for each chunk:
allocating a sender thread to the chunk;
transmitting by the sender thread using an object storage Application programming interface (API), the chunk having the predetermined size as an object, to the object storage, to be stored as an object; and
updating the mapping object with details of the chunk;
subject to the data set being fully split and no more chunks to be transmitted, transmitting the mapping object to the object storage by the sender thread; and writing an identifier of the data set and meta data including an object name of the mapping object, to a database stored in a storage device of the mainframe.

2. The method of claim 1, wherein splitting the data set into a multiplicity of chunks comprises repeating:
extracting a block from the data set; and
adding the block into a chunk until the chunk reaches the predetermined size,
until all blocks have been extracted from the data set.

3. The method of claim 2, wherein extracting the block from the data set is performed by data facility data set services (DFDSS) being called with a callback function parameter, wherein the DFDSS calls the callback function during extracting the block from the data set to thereby accumulate chunks from a sequence of blocks.

4. The method of claim 1, wherein allocating the sender thread to the chunk comprises:
queuing the chunk to a chunk queue; and
having an available sender thread dequeue a chunk from the chunk queue.

5. The method of claim 1, further comprising compressing the chunk or encrypting the chunk prior to transmitting the chunk to the object storage.

6. The method of claim 1, wherein the chunk is transmitted over TCP/IP.

7. A computer-implemented method comprising:
receiving a request to restore a data set from an object storage, to a mainframe;
querying a database stored in a storage device of the mainframe to retrieve an object name of a mapping object associated with the data set;
reading the mapping object from the object storage;
invoking data facility data set services (DFDSS);
for each chunk from the chunks described in the mapping objects, the chunk stored in the object storage as an object,
requesting and receiving, by the mainframe, the chunk from the object storage using object storage API, each chunk having a sequence number; and
restoring the data set from the chunks in accordance with the sequence number.

8. The method of claim 7, wherein invoking the DFDSS comprises providing a callback function.

9. The method of claim 8, wherein restoring the data set from multiplicity of chunks comprises repeating:
extracting one or more blocks from the chunk;
passing the one or more blocks to the DFDSS by the callback function; and
restoring the data set from the blocks.

10. The method of claim 7, further comprising decrypting or decompressing each chunk received from the object storage.

11. The method of claim 7, wherein the chunk is received over TCP/IP.

12. A system for backup and restore mainframe data on a backup server, comprising:
a processor, the processor being adapted to perform a first set of steps comprising:
receiving a request for backing up a data set from a mainframe onto an object storage;
splitting the data set into a multiplicity of chunks, each chunk of the multiplicity of chunks having a predetermined size;
creating a mapping object;
repeating for each chunk:
allocating a sender thread to the chunk;
transmitting by the sender thread using an object storage Application programming interface (API), the chunk having the predetermined size as an object, to the object storage, to be stored as an object; and
updating the mapping object with details of the chunk;
subject to the data set being fully split and no more chunks to be transmitted, transmitting the mapping object to the object storage by the sender thread; and
write an identifier of the data set and meta data including an object name of the mapping object, to a database stored in a storage device of the mainframe.

13. The system of claim 12, wherein the processor is further adapted to perform a second set of steps comprising:
receiving a request to restore a data set from an object storage, to a mainframe;
querying the database to retrieve an object name of a mapping object associated with the data set;
reading the mapping object from the object storage;
invoking data facility data set services (DFDSS);
for each chunk from the chunks described in the mapping objects,
requesting and receiving a chunk from the object storage using object storage API, each chunk having a sequence number; and
restoring the data set from the chunks in accordance with the sequence number.

14. The system of claim 13,
wherein splitting the data set into a multiplicity of chunks comprises repeating:
extracting a block from the data set; and
adding the block into a chunk until the chunk reaches the predetermined size,
until all blocks have been extracted from the data set; and
wherein restoring the data set from multiplicity of chunks comprises repeating:
extracting one or more blocks from the chunk;
passing the one or more blocks to the DFDSS by the callback function; and
restoring the data set from the blocks.

15. The system of claim 13, wherein extracting the block from the data set or restoring the data set from the blocks is performed by data facility data set services (DFDSS) being called with one or more callback function parameters, wherein the DFDSS calls the callback functions during extracting the block from the data set or during restoring the data set from the blocks.

16. The system of claim 13, wherein the processor is further adapted to compress or encrypt the chunk prior to transmitting the chunk to the object storage, or to decompress or decrypt each chunk received from the object storage.

17. The system of claim 13, wherein the chunk is transmitted or received over TCP/IP.

18. A computer program product comprising a computer readable storage medium retaining program instructions, which program instructions when read by a processor, cause the processor to perform a method comprising:
performing a backup operation, comprising:
receiving a request for backing up a data set from a mainframe onto an object storage;
splitting the data set into a multiplicity of chunks, each chunk of the multiplicity of chunks having a predetermined size;
creating a mapping object;
repeating for each chunk:

allocating a sender thread to the chunk;
transmitting by the sender thread using an object storage Application programming interface (API), the chunk having the predetermined size as an object, to the object storage, to be stored as an object; and
updating the mapping object with details of the chunk;
subject to the data set being fully split and no more chunks to be transmitted, transmitting the mapping object to the object storage by the sender thread; and
writing an identifier of the data set and meta data including an object name of the mapping object, to a database stored in a storage device of the mainframe; and performing a restore operation, comprising:
receiving a request to restore a data set from an object storage, to a mainframe;
querying the database to retrieve the object name of a mapping object associated with the data set;
reading the mapping object from the object storage;
invoking data facility data set services (DFDSS);
for each chunk from the chunks described in the mapping objects,
requesting and receiving a chunk from the object storage using object storage API, each chunk having a sequence number; and
restoring the data set from the chunks in accordance with the sequence number.

* * * * *